United States Patent Office 3,400,206
Patented Sept. 3, 1968

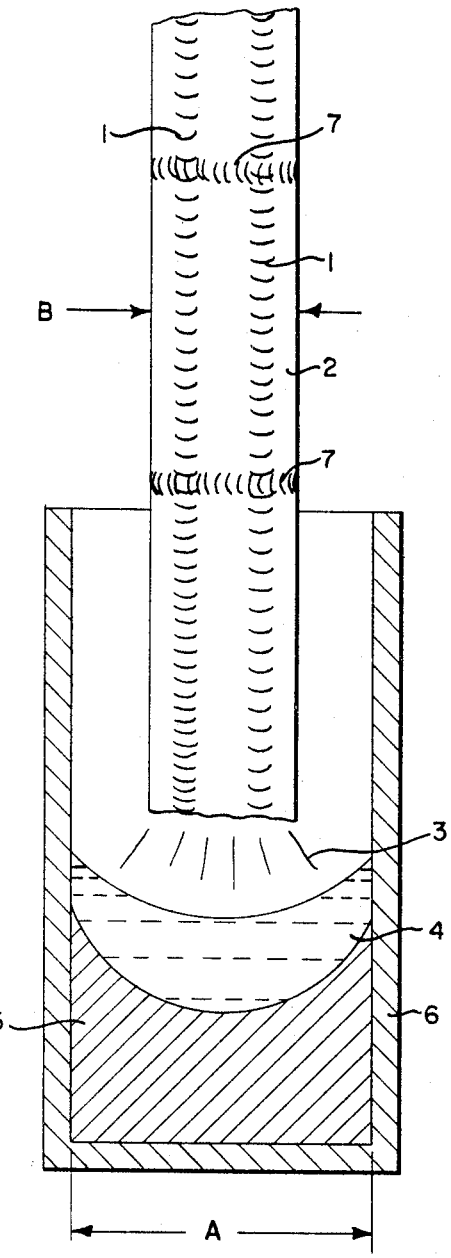

3,400,206
CONSUMABLE ELECTRODE STABILIZED AGAINST WARPING, FORMED FROM COMPACTED REFRACTORY METAL PARTICLES
Walter J. Barth, Hockessin, Del., assignor to E. I. du Pont de Nemours and Company, Wilmington, Del., a corporation of Delaware
Filed Apr. 9, 1965, Ser. No. 446,899
9 Claims. (Cl. 13—18)

ABSTRACT OF THE DISCLOSURE

A process for arc-melting, and a consumable electrode for use in electric arc-melting prepared by compacting particles of a refractory metal within a foil container of the said metal, wherein the electrode has at least one metallic strip of lower electrical resistance than that of the electrode welded along substantially the entire length of the periphery of the electrode to provide stability against warpage of the electrode during use.

---

This invention pertains to an improvement in the electric arc-melting of compacted electrodes. More particularly the invention is directed to the improvement, in a process for arc-melting a vertically-mounted consumable electrode prepared by compacting particles of a refractory metal and having the characteristic of warping when an electric arc melting current is passed through it, which comprises providing at least one metallic path of lower electrical resistance than that of the compacted, consumable electrode, substantially throughout the length of said electrode and in electrical contact with its top.

In the drawing there is shown, in cross section, an embodiment of the invention wherein the path of low electrical resistance is provided by a pair of weld-beads 1 longitudinally disposed along the periphery of the consumable electrode 2, 90° apart, from the top to the bottom. At the bottom of the electrode is the melting arc 3, which forms a pool of melted metal 4, on top of the solidified ingot 5. The solidified ingot is formed by cooling the molten metal in water-cooled crucible or mold, 6. The consumable electrode is made up of a plurality of compacts butted end-to-end and welded together with girth beads 7. The ratio of the diameter of the consumable electrode B to the interior diameter of the cooled crucible A can vary considerably, as from 0.4 to 0.7, the advantages of the invention becoming more apparent as this ratio approaches unity. At the top, the consumable electrode is mounted in an adapter and connected to a source of electrical current, not shown.

Refractory metals to which this invention pertains are high melting, strong metallic elements such as columbium, chromium, molybdenum, tantalum, tungsten and vanadium and alloys of at least two of these with each other. These metals are often peprared or recovered in particulate form such as sponge, granules, powder, chips or turnings which require consolidation to form solid sound ingots from which useful forms of the metal can be made. This consolidation is usually effected by arc-melting a compacted, consumable electrode of the metal in a cold crucible. The crucible is usually made of copper and is externally water-cooled to prevent it from melting. Vacuum and/or inert gas atmoshpere is maintained in the crucible to avoid reaction of these metals with, for example, air. usually the crucible bottom is protected against the deleterious action of the initial arc by providing a bed of metal particles of the same composition as intended for the ingot. When the arc is struck between the vertically-mounted, compacted electrode and this bed of particles, the particles and the tip of the electrode melt, but quickly solidify in the crucible. The arc is then maintained between the melting electrode and the pool of molten metal at the top of the growing ingot.

For practical reasons, inasmuch as these metals are almost always double arc melted, the ingot diameter is not much greater than that of the electrode. It is therefore necessary to position the electrode in the center of the crucible so that no part of it comes within arcing distance of the side wall. This is possible to accomplish within quite good tolerance if the electrode is straight. However, compacted electrodes of the high melting metals frequently bend or warp when the heavy arc current is applied. This often leads to wall arcing and even to contact between crucible wall and electrode. In either case, it is necessary to shut down the operation, remove, straighten and reposition the electrode. Not only is this time-consuming and expensive, but the side-wall arcing or contact is very likely to cause a "burn through" and this may lead to an explosion if the cooling water contacts the molten metal.

It is, therefore, an object of this invention to prevent warping and lateral displacement of refractory metal compacted electrodes during arc-melting. A further object is to prevent such warping without contaminating or changing the desired chemical composition of the ingot being produced. Other objects will appear hereinafter.

Now according to the present invention it has been found that an electrode which presents the aforementioned difficulties can be improved by providing an electrical conductor having relatively low electrical resistance, said conductor being positioned along the periphery of the vertically-mounted electrode and in electrical contact therewith from its upper electrical contact to its lower, melting end during the arc-melting operation. This conductor provides a path of low resistance, and hence improved conductivity, along the electrode. The conductor can consist of a strip, or strips, of sound metal extending from the upper electrical contact down the side of the compacted electrode substantially to the point of arc-melting at the lower end. The strip or strips are of such a size that they provide sufficient cross-section to conduct the necessary current without excessive resistance-heating of the electrode. The strips are preferably of the same chemical compositions as the ingot, or nearly so.

While the strips can be attached to the electrode by welding, it is preferred that they be formed from the compact itself by running a weld bead of sufficient depth and width to provide the desired path of low electrical resistance down the side of the electrode. At least one such strip or bead is used, but it is preferred to use two or more. When several are employed it is preferable to space them equidistant around hte electrode. The required total cross section of the strips can be determined experimentally for each type of metal compact and each electrode size. Experience is usually available which will enable one to estimate quite closely the amount of current required in the melting operation. Thus, knowing the electrical conductivity of the metal, the cross section required can be calculated and the strips or beads prepared accordingly. No ill effect of additional bead cross section has been noted other than the expenditure of effort in making it. Two to four longitudinal beads are usually adequate. For example on a 2 inch diameter columbium compact two welds 180° apart, ¾ to 1 inch wide and ¼ to ½ inch deep, were found satisfactory when the compact was arc-melted in a four inch crucible allowing only a one inch circumferential clearance.

It is usually expedient and safest to contiue the beads or other strips all the way of the lower tip of the initial electrode. However, for the prevention of harmful warping only, the strips can be terminated as much as one diameter of the compact from bottom end. Such treatment affords a path of good conductivity from the point of electrical contact at the top substantially to the lower tip. Shortly after melting begins the path is complete as to the unmelted portion. To obtain the full benefit of this invention, including easier striking of the arc, a full length path is justified.

As a further assurance of adequate electrical conductivity, the longitudinal beads, or strips, can be inter-connected by transverse peripheral strips or beads. This is conveniently done, because in actual practice several relatively short compacts are butt-welded to form the consumable electrode. It is a simple matter to interconnect this butt weld with the longitudinal weld beads.

It is also desirable to establish good electrical contact between the upper end of the strips or beads and the electrode holder or clamp to which the main electrical connection is made. While various clamps can be used, it is preferable, especially in view of the close crucible clearances made possible by this invention, to use an adapter made of a metal compatible with the electrode. This adapter is mounted, e.g., by a threaded connection, on the electrode holder, which is usually a water-cooled copper pipe mounted in a raising and lowering mechanism for positioning and feeding the electrode. The compacted electrode is butt-welded to this adapter. By being compatible it is meant that the adapter metal can be welded to the compact and will not contaminate it unduly. An adapter of the same composition, of course, is usually ideal. When the compact is welded to the adapter as described the desired electrical path is easily completed by welding the side strips or beads into the adapter itself.

The exact function of the weld beads or strips used in this invention has been open to some speculation. It was thought that they might serve as a strengthening framework and thereby keep the electrode from warping. On the other hand, it was observed that compacted electrodes became very hot, bright red or hotter, when melted without the strips. When strips were used the electrode remained much cooler. It was therefore theorized that warping was due to the uneven resistance heating of the electrode as the heavy current passed through it. Heating resulted because, in the compact, there was insufficient sound metal to conduct such a current without heating. Furthermore, since such compacts were not physically uniform throughout, an uneven resistance heating could cause uneven expansion and sintering to cause warping. This phenomenon is most frequently noticed in compacts of tantalum and tungsten which have such high melting points that it is very difficult to establish the necessary electrical conductivity by normal sintering procedures. The foregoing explanations appear to fit the facts, but the invention is not limited thereto, except as is inherent in the appended claims.

This method of stabilizing electrodes is well adapted to instances where a plurality compacted consumable electrodes are mounted side by side in spaced relationship for melting.

EXAMPLE 1

Columbium granules, produced by hydrogen reduction of $NbCl_5$ and having an average diameter of about two millimeters, were hydrostatically compacted to form consumable electrode units 2 inches in diameter and 15 inches long, in the following manner: The granules were enclosed in 20 mil columbium foil, and a tough polyester film. This package was placed in a heavy rubber, cylindrical compaction container and the whole assembly hydrostatically compacted at 60,000 p.s.i. This procedure is more fully described in copending application, Ser. No. 314,610, filed Oct. 8, 1963. The rubber and organic films were removed from the foil-covered, cylindrical compact so produced.

Three of these compacts were butt-welded end-to-end, under argon, to form an electrode about 45 inches long. Using an inert-gas shielded electric arc, two weld beads 180° apart were run longitudinally from end-to-end along the sides of the electrode. In this instance careful, slow welding was required in order to avoid burning away the foil, which was needed to prevent the granules from running out. The beads were approximatley ¾" wide and ⅓" deep. The electrode was then butt-welded to the adapter member of the arc-melting apparatus with good electrical contact to the weld beads, and subjected to the usual vacuum arc-melting operation.

The melting was smooth and the arc maintained excellent characteristics, because the lower end of the electrode remained well centered in the cold crucible. In other trials, without the weld beads, these slender electrodes warped under the uneven heating effected by poor conductivity, and arced against the crucible side wall. Immediate shutdown was required to prevent disastrous crucible burn through.

EXAMPLE 2

A blend of metal granules proportioned to yield a tantalum base alloy containing 30% Cb and 8% V was prepared. The batch consisted of 89.5% of Ta-Cb master alloy granules (30.6% Cb), 2.5% pure Cb granules, and 8% vanadium chips. The thoroughly mixed granules were packaged and compacted as in Example 1, except that the compacts were about 4.5 inches in diameter.

These compacts were butt-welded to form an electrode. Four weld beads, 90° apart, were run longitudinally along the electrode from end to end. The beads were approximately 1" wide and ½" deep. They appeared continuous and sound. The butt welds in this case were made circumferentially continuous; thus each interlinked the longitudinal welds in four places and thereby assured a low-resistance electrical path to the melting tip.

This electrode was then welded to a columbium adapter member and mounted in the arc-melting furnace. The electrode was arc melted in an 8" I.D. cold copper crucible, thus allowing a maximum of 2" clearance therebetween. A current ranging from 6700 to 7000 amperes at from 28–31 volts was used to melt the electrode. The melting was satisfactory, with substantially no warping occurring. A further advantage of ease in starting the arc was noted and attributed to the increased conductivity along the weld bead network.

I claim:

1. In a process for arc-melting a vertically mounted, consumable electrode prepared by compacting particles of a refractory metal packaged within a foil container of the said metal, which electrode has the characteristic of warping when an electric arc-melting current is passed through it, the improvement which comprises welding at least one metallic strip of lower electrical resistance than that of the compacted consumable electrode, substantially throughout the length of said electrode and in electrical contact with its top.

2. In a process for arc-melting a vertically mounted, consumable electrode prepared by compacting particles of a refractory metal selected from the group consisting of columbium, chromium, molybdenum, tantalum, tungsten, and vanadium, and alloys of at least two of these metals with each other, which electrode has the characteristic of warping when an electric arc melting current is passed through it, the improvement which comprises providing at least one weld bead of lower electrical resistance than that of the compacted, consumable electrode, along its periphery substantially throughout its length and in electrical contact with its top.

3. The process of claim 1 wherein the said metallic strip is a weld bead.

4. The process of claim 3 wherein the said weld bead is formed from the same material as the said compacted refractory metal.

5. The process of claim 2 wherein the said weld bead is formed from the same material as the said compacted refractory metal.

6. A warpage stabilized, consumable electrode for use in electric arc-melting, comprising a consumable electrode of compacted particles of a refractory metal packaged within a foil container of the said metal, the said electrode having welded substantially along the entire length of its periphery at least one metallic strip of lower electrical resistance than that of the said electrode.

7. The electrode of claim 6 wherein the said refractory metal is selected from the group consisting of columbium, chromium, molybdenum, tantalum, tungsten, and vanadium, and alloys of at least two of these metals with each other.

8. The electrode of claim 7 wherein the said metallic strip is a weld bead.

9. The electrode of claim 8 wherein the said weld bead is formed from the same metal as the said compacted refractory metal.

References Cited

UNITED STATES PATENTS

| 1,977,128 | 10/1934 | Hawkins | 219—145 |
| 2,137,471 | 11/1938 | Zublin | 219—145 |
| 2,700,091 | 1/1955 | Culbertson et al. | 219—146 |

OTHER REFERENCES

Welding Handbook, 1942 edition, New York American Welding Society.

BERNARD A. GILHEANY, *Primary Examiner.*

H. B. GILSON, *Assistant Examiner.*